United States Patent [19]
Greenhalgh

[11] Patent Number: 5,226,618
[45] Date of Patent: Jul. 13, 1993

[54] LIFT ENHANCEMENT DEVICE

[75] Inventor: Samuel Greenhalgh, Doylestown, Pa.

[73] Assignee: The United States of America as represented by the Secretary of the Navy, Washington, D.C.

[21] Appl. No.: 830,206

[22] Filed: Jan. 30, 1992

[51] Int. Cl.$^5$ ............................................. B64C 3/28
[52] U.S. Cl. .................................. 244/213; 244/130; 244/215
[58] Field of Search ............ 244/153 R, 154, 900–904, 244/123, 131, 130, 198, 214, 215, 213, 219, 90 R; 446/30, 34, 66, 61, 62, 64, 67; 16/225

[56] References Cited

U.S. PATENT DOCUMENTS

| | | | |
|---|---|---|---|
| 2,368,702 | 2/1945 | Bourne | 244/130 |
| 2,762,590 | 9/1956 | Huie | 244/153 R |
| 4,667,898 | 5/1987 | Greenhalgh | 244/219 |
| 4,867,396 | 9/1989 | Wainfan | 244/198 |

FOREIGN PATENT DOCUMENTS

| | | | |
|---|---|---|---|
| 483018 | 4/1938 | United Kingdom | 446/66 |
| 530663 | 7/1955 | United Kingdom | 446/64 |

*Primary Examiner*—Galen Barefoot
*Attorney, Agent, or Firm*—James V. Tura; James B. Bechtel; Susan E. Verona

[57] ABSTRACT

A lift enhancing device for an inextensible, membraneous wing is disclosed. The device comprises the "forced" reattachment of a section of the trailing edge back to the trailing edge so that a warp is introduced therein. The section is reattached with flexible tape to allow oscillation of the section, and increased lift from the wing, at prescribed airspeeds.

8 Claims, 6 Drawing Sheets

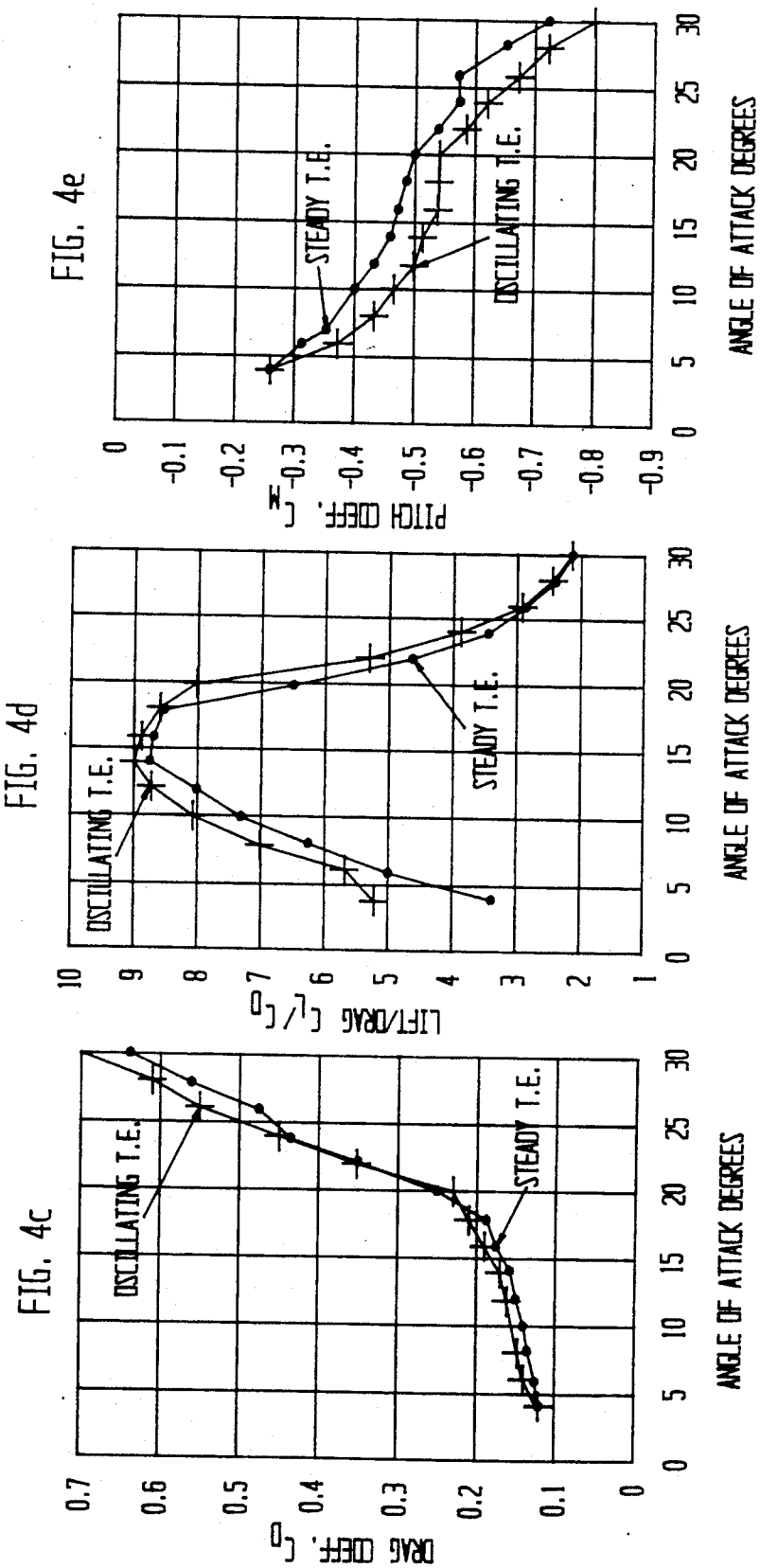

LIFT ENHANCEMENT DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to aircraft having single surface membraneous airfoils, or wings, and a means for increasing the lift obtainable therefrom.

Single surface flexible lifting wings have many applications due to low cost and simplicity of construction. One such application is explained in my U.S. Pat. No. 4,667,898 entitled "Aircraft With Single Surface Membraneous Airfoils", issued May 26, 1987. In that patent, a single surface membraneous airfoil, deployable from a stowed position in the fuselage of an aircraft to a fully extended position by pivotal spars attached to the leading edges, is disclosed. Each membrane airfoil is made from an inextensible, nonporous membrane such as two thousandths (0.002) inch thick stainless steel fixedly fastened to a rigid spar to produce a parabolic or triangular planform. It therefore has been demonstrated that a single-surface membraneous airfoil is suitable for in-flight control of an aircraft. Further, that such membraneous airfoils are aerodynamically stable and are suitable for selected types of vehicles, such as remotely-piloted vehicles (RPV).

Aerodynamic research involving wings and airfoils continues to search for ways to improve the lifting characteristics of airfoils by whatever means for purposes of improved flight parameters, larger payload capability or better handling characteristics at predetermined velocities. Towards this end, U.S. Pat. No. 4,867,396 to Barnaby S. Wainfan, issued on Sep. 19, 1989, and assigned to the Lockheep Corporation discloses that it is known to fixedly attach a small flap-like device to the trailing edge of an aircraft airfoil to improve the coefficient of lift and reduce the coefficient of drag thereof. This flap is a flat, plate-like member having a length of between 0.5% to 1.50% of the chord of the airfoil and is positioned at a downward angle to the chord of between 5° and 25°. Preferably, the length of the flap is approximately 1% of the chord and the preferred angle to the chord is 20°.

In another patent, U.S. Pat. No. 4,858,852 to Preston A. Henne et al., issued on Aug. 22, 1989, and assigned to the McDonnell Douglas Corporation, it is disclosed that a special contour near the trailing edge of an airfoil improves the airfoil effectiveness. This special contour consists of a blunt base, a region of high local concave curvature, typically on the lower or higher pressure surface at or near the trailing edge, and upper surface and lower surface slopes at the airfoil trailing edge that diverge from each other. It is maintained that this trailing edge design alters the normal matched upper surface and lower surface pressures, or the Kutta condition, for airfoil section lift determination. Here it is maintained that all trailing edge devices produce surface discontinuities which produce earlier boundary layer separation, drag penalties and the loss in camber effectiveness resulting from these discontinuities.

U.S. Pat. No. 4,387,868 to Robert J. Englar et al., dated Jun. 14, 1983, assigned to the United States of America as represented by the Secretary of the Navy, entitled "Mono-Element Combined Supercritical High Lift Airfoil", discloses a multi-purpose mono-element airfoil for aerodynamic and hydrodynamic vehicles and devices. In aerodynamic applications, the airfoil is a no-moving parts high lift and cruise airfoil which in conjunction with a plenum, upon pressure initiation, causes pressurized air to issue from a slot tangent to the airfoil surface and remain attached to the airfoils shaped trailing edge, providing a controlled resultant force of thrust.

U.S. Pat. No. 3,399,848 to H. Weiss, entitled "Device For Preventing Trailing-Edge Fluttering Of Paraglider Airfoils", issued on Sep. 3, 1968 and assigned to the Doznier System GmbH describes a device for preventing luffing the undesirable large scale disorganized fluttering of flexible trailing edges of paraglider airfoils. The device consists of an aerodynamic-disturbing strip mounted on the pressure side of the wing parallel to the trailing edge thereof and at a right angle to the flexible surface. As a result of the construction, fluttering of the fabric covering in the rear area of paraglider airfoils and similar aerodynamically-active surfaces including flexible covering elements is effectively prevented within the normal range of angle of attack.

The last-named patent teaches away from the concepts known as unsteady aerodynamics, where vibrational or oscillating members can either produce destructive effects, with diminished stability and control, or produce positive additions to a vehicle's flight. The instant invention shows that, within selected parameters, unsteady aerodynamics improves the lifting characteristics of an airfoil without any proportional increase in drag.

SUMMARY OF THE INVENTION

It is an object of the present invention to provide a membraneous airfoil with improved lifting abilities due to an oscillating trailing edge.

It is another object of the present invention to provide a membraneous airfoil with improved lifting abilities concommittant increased drag.

It is still another object of the present invention to provide a membraneous airfoil with improved lifting abilities at predetermined airspeeds.

It is a further object of the present invention to provide a self-driven oscillating trailing edge flap that undergoes a limit cycle oscillation.

These and other objects and many attendant advantages of the present invention are obtained where an oscillating flap section, in the neighborhood of between 0.25 and 0.050 of the chord, that is removed from a selected portion of the trailing edge planar surface of a membrane wing, is flexibly reattached thereto with a predetermined wrinkle, or uneven warp in the planar surface, in the contour. The uneven reattachment provides an unbalanced surface for the passing airstream to react against and, because of the flexible reattachment, therefore an oscillating flap section. Greater lift for the membrane wing is generated.

The novel features which are believed to be characteristics of the invention, both as to its organization and methods of operation, together with further objects and advantages thereof, will be better understood from the following descriptions in connection with the accompanying drawings in which the presently preferred embodiments of the invention are illustrated by way of examples. It is to be expressly understood, however,

BRIEF DESCRIPTION OF THE DRAWINGS

FIG. 4c shows a graph of the coefficient of drag ($C_D$) versus the angle of attack ($\alpha$);

FIG. 4d shows a graph of the quotient of coefficient of lift ($C_L$) divided by coefficient of drag ($C_D$) versus angle of attack ($\alpha$);

FIG. 4e shows a graph of the pitch coefficient ($C_M$) versus angle of attack ($\alpha$) for the same airfoil.

DETAILED DESCRIPTION OF THE PREFERRED EMBODIMENT

Figure 1:
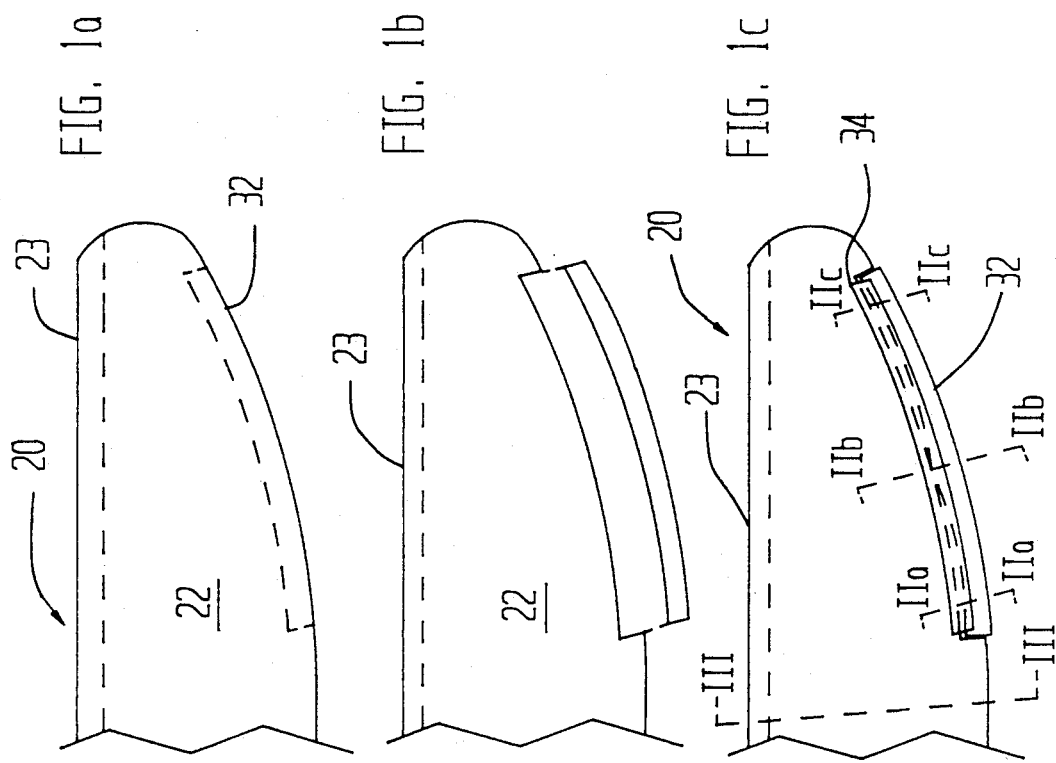
FIGS. 1a, 1b and 1c show plan views, partially broken away, of a membraneous airfoil showing the removal and reattachment of the lift enhancement device to the trailing edge.

Referring now to the drawings, wherein like reference characters designate like or corresponding parts throughout the several views, there is illustrated in FIGS. 1a, 1b and 1c the steps taken to convert a standard, parabolic planform membraneous wing 20 with standard trailing edge 25 (FIG. 1a) into a wing with an oscillating trailing edge 28 (FIG. 1c). Wing 20 can be made from hardened stainless steel shim stock 22 having a thickness of from 0.002 inches to 0.004 inches that is fastened, by means known in the art, to a predetermined length of streamlined (leading edge) spar tubing 23. Tubing 23 should be approximately 1.375 inches wide and 0.5625 inches thick, and, on the model built for wind-tunnel testing, be approximately 36 inches long.

Figure 2:
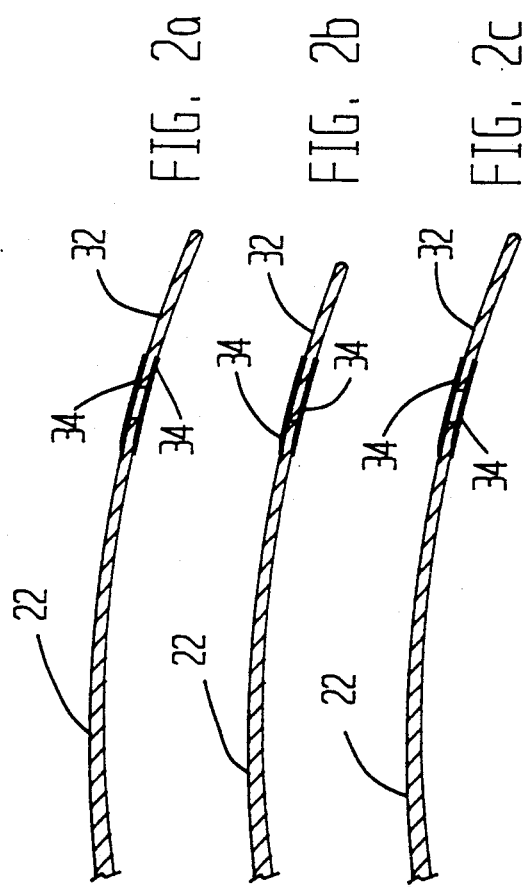
FIGS. 2a, 2b, and 2c are sectional views of the membraneous wing taken along lines IIa—IIa, IIb—IIb, and IIc—IIc respectively.
Figure 3:
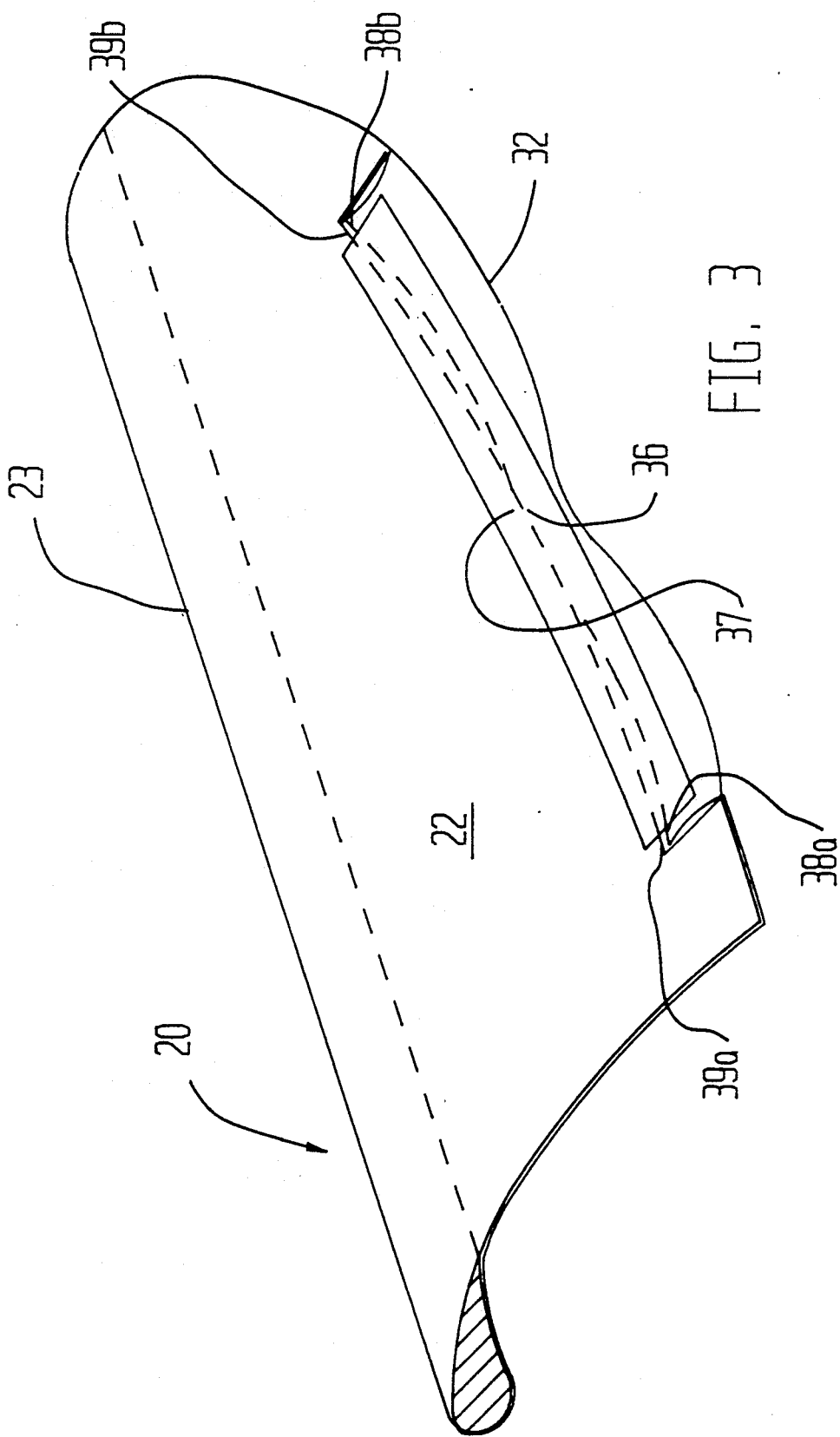
FIG. 3 is a perspective view of the membraneous airfoil of FIG. 1c.

FIGS. 2a, 2b and 2c are cross-sectional views of wing 20 taken along lines IIa—IIa, IIb—IIb and IIc—IIC of FIG. 1, respectively. FIG. 3 shows a perspective view of wing 20 taken along lines III—III of FIG. 1. As shown in FIG. 1a, a rectangular-shaped section 32, approximately the size of 0.25 of the chord and 80% of the semi-wingspan, of the trailing edge 28 is identified. Section 32 is separated, by means known in the industry, from trailing edge 28 at a location therein that could be inboard, mid-span or outboard on the trailing edge (as shown in FIGS. 1a, 1b and 1c), and then rejoined to that same location by two strips 34 of 1" wide 0.001" thick tape. One strip is used to attach the adjacent upper surfaces and the other strip is used to attach the lower surfaces (as seen in FIGS. 2a, 2b and 2c). Upon reattachment, section 32 is bent out of its plane by butting the center portion 36 (seen more clearly in FIG. 3) adjacent and touching the corresponding location 37 on the remaining trailing edge and forcing small gaps, at opposite ends of section 32, where end portions 38a, 38b would normally close into touching engagement with the corresponding locations, 39a, 39b, respectively, of the cut-out portion of trailing edge 28 creating an "out-of-plane" warp, as seen in FIG. 3. This reattachment procedure produces an oscillating section of the trailing edge that is warped or non-planar. Section 32 becomes a bi-stable mechanical flap that, when subjected to aerodynamic forces, produces an aeromechanical limit cycle oscillator and shows a flow-induced oscillation.

The data presented in FIGS. 4a through 4e come from wind tunnel tests conducted in the manner known in the industry on the semispan membrane wing 20 mounted in the Princeton University 4'×5' subsonic tunnel. Wing 20 was mounted on a vertical turntable (not shown) that was set into a reflection plane. The root of leading edge spar 23 was mounted in a spherical bearing (not shown) and the top of spar 23 was attached to an adjustable rod support (not shown) off the main beam of the wind tunnel balance. The wing root trailing edge attachment (not shown) was connected to a rod-end spherical bearing mounted on a manually operated, screw actuated, chord length adjustment slide. As configured, the turntable was rotated to adjust the angle of attack of wing 20 and wing twist and camber were set by adjustments made at the wing tip and at the wing root trailing edge. The reflection plane was mounted on a rigid steel bracket and secured through an opening in the wind tunnel floor to the main beam of the wind tunnel balance to control side loading on the reflection plane. Reference is made to further details in a report, that I co-authored, entitled "Aerodynamic Characteristics of a Flexible Membrane Wing" AIAA Journal, Vo. 24, No. 4, April, 1986, incorporated herein by reference.

Figure 4A:
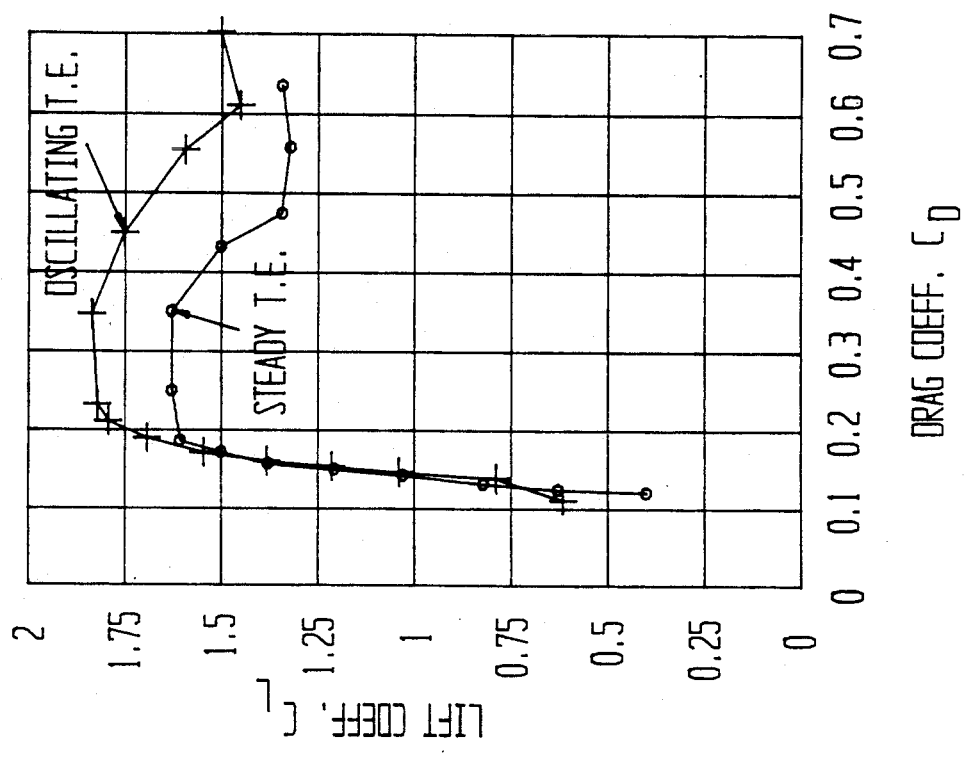
FIG. 4a shows a graph of coefficient of lift ($C_L$) vs the angle of attack ($\alpha$) of the membraneous airfoil with the enhanced lifting device thereon.

FIG. 4a shows a plot of the lift coefficient ($C_L$) versus the angle of attack ($\alpha$) at a Reynolds number of $3 \times 10^5$ for both a steady membrane wing and a membrane wing with a trailing edge flap. As shown, the model with the oscillating trailing edge produces an increase in the lift over the lift produced for similar conditions on the steady wing.

Figure 4B:
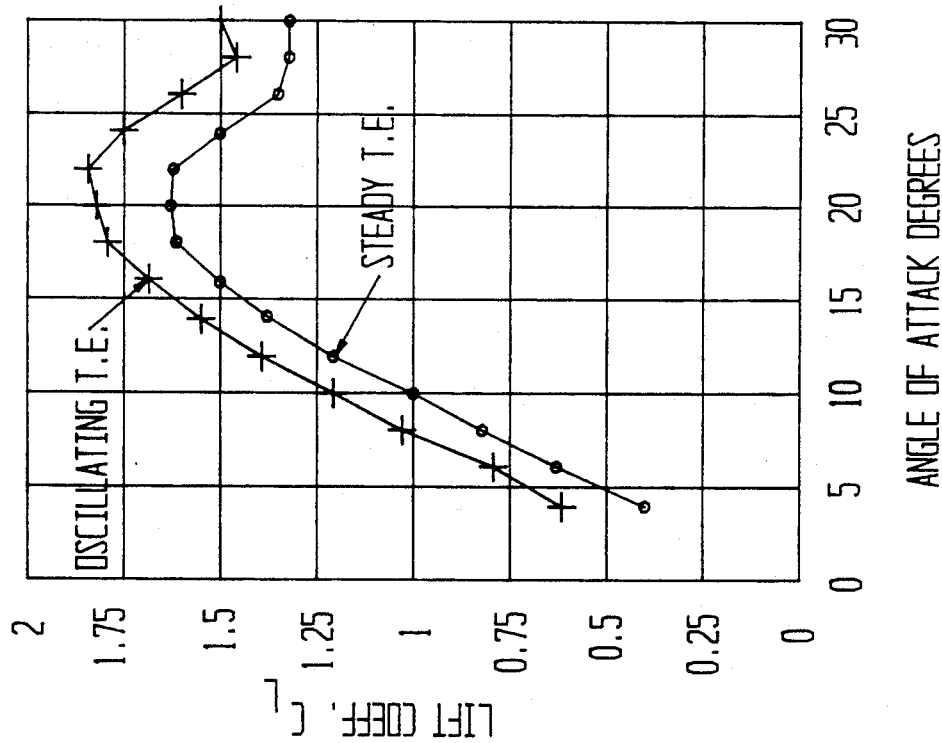
FIG. 4b shows a graph of the coefficient of lift ($C_L$) versus the coefficient of drag ($C_D$) of the same airfoil.

FIG. 4b shows a comparison plot of the lift coefficient ($C_L$) versus the drag coefficient ($C_D$) between the wing of the instant invention and a membrane wing with a steady trailing edge. It shows that the model with the oscillating trailing edge produces higher lift for a given drag value compared to the steady wing.

In FIGS. 4c, 4d and 4e, comparisons of drag coefficient ($C_D$), lift over drag ($C_L;C_D$) and pitch coefficient ($C_M$) versus angle of attack between the membrane wing with an oscillating trailing edge and a steady membrane wing are shown. Again, it can be clearly seen that the oscillating trailing edge wing produces lift increases over the complete range of angle of attack, 1° to 30°, compared to the steady wing.

Figure 5:
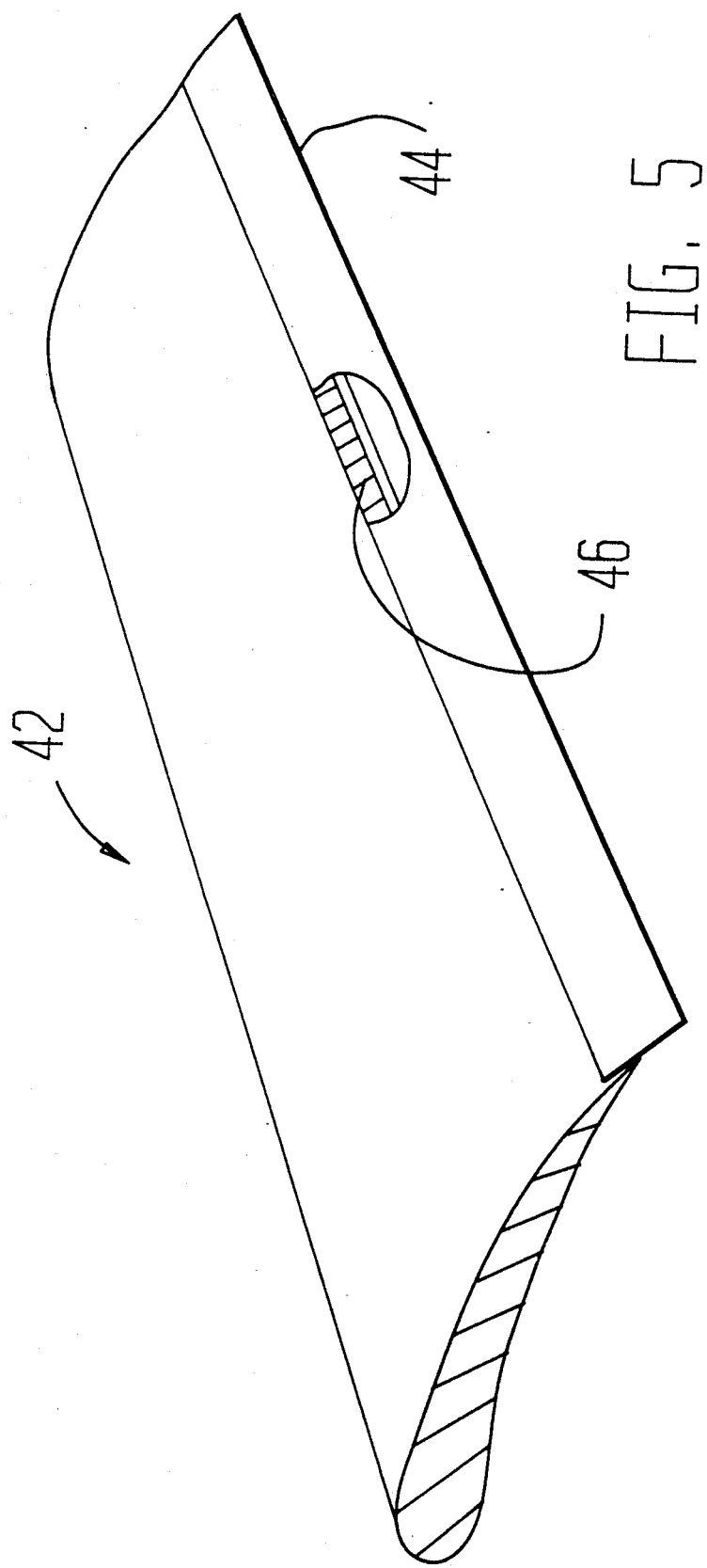
FIG. 5 shows a perspective view of an alternate embodiment of the invention showing a trailing edge flap attached to the trailing edge of a semi-span wing.

As an alternate embodiment, a solid wing with a continuous oscillating trailing edge, as shown in FIG. 5, was constructed and tested. First, as above, a baseline of performance data was taken. The solid wing used consisted of a mahogany three foot semi-span tapered wing with a twelve inch root chord and an eight inch tip chord, a section built to be identical to the NACA 633-018 design. The leading edge is swept and the trailing edge unswept.

Next, the same wing section was modified to add a membrane trailing edge to arrive at wing section 42. Several different types of material were experimented with before deciding to employ a rectangularly shaped flap 44. Flap 44 consists of a .001 inch thick by three inches wide by 36 inches long strip of stainless steel shim stock. As seen in the broken-away section of FIG.

5, a one inch strip of double-sided, adhesive-backed tape 46 is affixed to the last one inch of the trailing edge and the front one inch of section 44 is then affixed to the opposite side.

Data taken while the solid wing section 42 with a 1 mil. oscillating flap 44 was installed in the same wind tunnel showed surprising results compared to the plain unflapped wing, lift was increased over the range of angles of attack from $-10$ degrees to 19 degrees and the drag was reduced over the range of angles of attack from $-2$ degrees to 18 degrees.

A second three piece joined flap (not shown) made from 2 mil stainless steel $1\frac{1}{2}''$ overall length long also produced surprising results. Compared to the plain unflapped wing, the lift doubled and the drag increased by an order of magnitude.

Finally, while the oscillating membraned wing has been described with reference to a particular embodiment, it should be understood that the embodiment is merely illustrative as there are numerous variations and modifications, such as thickness and linear dimensions of the oscillating trailing edge, which may be made by those skilled in the art. Thus, the invention is to be construed as being limited only by the spirit and scope of the appended claims.

What I claim is:

1. A membraneous airfoil for aircraft comprising:
   a leading edge spar;
   a single-layered member attached to said spar and having a chord defined by the distance between said leading edge and a trailing edge; and
   means, in the form of a bi-stable mechanical flap, that exhibits flow-induced oscillations attached to the trailing edge.

2. A membraneous airfoil as described in claim 1 wherein said oscillating means comprises a section approximately the size of 0.25% of the chord in width and 90% of the wingspan in length removed from a predetermined location of the trailing edge plane and reattached to the same location.

3. A membraneous airfoil as described in claim 1 wherein said oscillating means is attached via 0.001 inch thick tape.

4. A membraneous airfoil as described in claim 2 wherein said oscillating means is reattached to have at least one warp in the trailing edge plane.

5. A membraneous airfoil as described in claim 4 wherein said single-layered member is comprised of stainless steel shim stock.

6. A solid, semi-span wing that produces increased lift comprising:
   a NACA $63_3$-018 airfoil section wing having leading and trailing edges;
   adhesive means affixed to the upper surface of the trailing edge; and
   a flap of stainless steel shim stock of predetermined length, width and thickness in the form of a bi-stable mechanical flap, that exhibits flow-induced oscillations and is attached to said adhesive means.

7. A solid, semi-span wing section as described in claim 6 wherein said flap is approximately the size of 20% of the chord in width and 100% of the wingspan in length.

8. A solid, semi-span wing section as described in claim 6 wherein said adhesive means comprises a dual-sided tape.

* * * * *